United States Patent

[11] 3,634,726

| [72] | Inventor | Pierre Jay<br>Decines, France |
|---|---|---|
| [21] | Appl. No. | 40,921 |
| [22] | Filed | May 27, 1970 |
| [45] | Patented | Jan. 11, 1972 |
| [73] | Assignee | Progil<br>Paris, France |
| [32] | Priority | June 3, 1969 |
| [33] | | France |
| [31] | | 6917118 |

[54] PROCESS AND DEVICE TO REMOVE STATIC ELECTRICITY FROM PLASTIC FILMS
4 Claims, 1 Drawing Fig.

[52] U.S. Cl..................................................... 317/2 R,
   317/2 F, 264/22
[51] Int. Cl..................................................... H05f 3/04

[50] Field of Search........................................... 317/2 R, 2
   A, 2 B, 262 A, 262 AE, 4, 2 F, 3; 264/22

[56] References Cited
   UNITED STATES PATENTS
   824,339  6/1906  Chapman..................... 317/2 R
   983,536  2/1911  Chapman..................... 317/2 F Primary Examiner—L. T. Hix
Attorney—Browdy and Neimark

ABSTRACT: Process and apparatus to remove static electricity from the surfaces of thermoplastic films, sheets and fabrics comprising creating, near the thermoplastic support to be treated, a silent electrical discharge by means of an enamelled wire maintained under a high voltage disposed parallel to said support and above which are provided earth-connected conductive pieces.

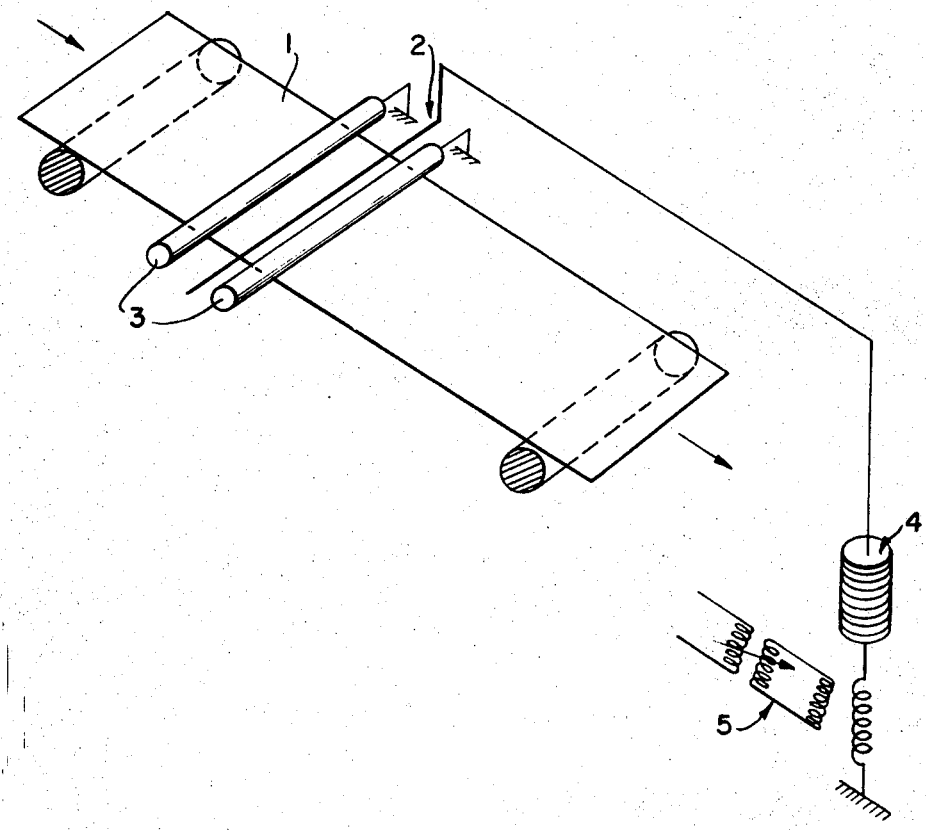
INVENTOR
PIERRE JAY
BY Browdy and Neimark
ATTORNEYS

PROCESS AND DEVICE TO REMOVE STATIC ELECTRICITY FROM PLASTIC FILMS

The present invention relates to new techniques and to a device intended for suppressing wholly static electricity which appears on the surfaces of thermoplastic polymer films, sheets or fabrics, during fabrication thereof or during the operations of winding or unwinding rolls thereof.

It has been already recommended to use various chemical or physical means to remove static electricity remaining between the surfaces of synthetic polymer materials. Physical means are generally based upon air ionization principle in the places where material is electrified in order to create numerous positive and negative charges in the space separating the "ionizer" from the electrified substance. The practical application of this principle has given rise to two types of devices: the type which is based upon electrostatic induction and which is constituted with series of metallic points connected to earth by a conductor; and the type in which air ionization is induced either by a source of radioelements, or in applying a high voltage on metal points, which voltage causes an ionizing electrical field.

Moreover, there are numerous devices based upon the property of high-intensity ionizing fields to give rise to luminous electrical discharges. Those devices act on polymer film surfaces in creating active centers which act as chain initiators for the formation of graft polymers, for initiating polymerization of various monomers or for making plastic surfaces microporous to make surfaces easier to glue to various materials or to improve the i.e., affinity with regard to inks and coloring agents.

However, there does not exist, insofar as is known, any simple and inexpensive apparatus which quickly and efficiently serves as a neutralizing device and which, contrary to the known devices using corona effect, does not affect the surface itself of materials to be treated. So it is one object of the invention to provide such a convenient device, answering safety standards, able to suppress quantitatively electricity charges which appear especially during the operations of winding or unwinding of films, sheets or fabrics of thermoplastic macropolymers such as during fabrication of metallized plastic films used for condenser construction.

The new process according to the invention consists of creating, near the support to be treated, a silent electrical discharge by means of at least an enamelled wire maintained under a high voltage, disposed parallel to said support and above which have been provided earth-connected conductive pieces.

The term "enamelled wire" includes any threadlike element of conductive material, the surface of which is coated with a thin layer of dielectrical substance (or "enamel"), which substance regularizes discharge current created at every point between the wire under voltage and the support to be treated.

It is possible to use, as wire material, any metal which is a good conductor of electricity, such as copper, steels, metal alloys, etc., provided that the wire to be used has a smooth surface and possesses a good mechanical strength in order to be able to be stretched above the support without any sagging or without vibration or loss of strength. Practically, the diameter of the chosen wire is the smallest existing in the contemplated material and compatible with the mechanical constraints which are imposed to it. Accordingly, the diameter may generally vary between 0.01 and 1 mm.

Coating enamel is chosen among the inorganic or organic dielectric materials capable of resisting the electrical discharge under the operative conditions. Conventional plastic materials in the form of varnishes or coatings, possibly filled with inorganic oxides, as for example polyesters, polyurethanes, epoxy resins, polyamides, polyimides, etc., are generally suitable. The coating thickness may vary depending on the deposited insulating substances and also depending on the wire diameter. This thickness is generally about 0.01 to 0.1 mm.

The voltage at which the wire is maintained is an alternate, i.e., AC voltage, the amplitude of which is a function of the diameter of the wire used. This amplitude is lower as the diameter chosen for the wire is reduced and for a given operation the amplitude will remain constant. The voltage value varies, for different operations, between about 2,000 and 8,000 volts. Voltage must be produced under a frequency greater than the usual frequency of electrical systems; such frequency may practically be between 300 and 2,000 Hertz without, in fact, an upper limit being able to be fixed.

The distance at which wire is maintained from the plastic film to be treated is generally between 1 and 10 mm. but, of course, this value depends upon discharge intensity and film unwinding speed.

As stated above, proximity grounds are involved in the process according to the invention and these are placed above the coated wire at such a distance that the majority of the lines of force are closed without passing through the surface of the plastic film to be discharged. In fact, this distance is approximately the same as the space between wire and film and consequently ranges from a fraction of mm. up to several mms.

The application of the process according to the invention is quite simple since it is sufficient to maintain, between the film to be treated which unwinds in a continuous way, and the enamelled wire which is under tension and voltage and near a ground, a regular corona discharge the amplitude of which is easy to regulate and is high enough to allow film quantitative discharge and weak enough not to give rise to any superficial film damage. Unwinding speed of plastic film depends, of course, upon the frequency of wire high voltage; it may, for example, vary between 0.5 and 4 m/s when frequency passes from 50 to 700 Hertz and reach at least 5 m/s for a frequency of about 1,500 Hertz. The wire under voltage has preferably a length corresponding to all the width of the surface of the film to be treated. According to a variant of the basic procedure, it may sometimes be advantageous to dispose several enamelled wires in parallel above the plastic surface. According to another embodiment, it is possible to place at least two wires facing one another or not, on every side of the film to be treated.

The invention will be better understood in referring to the attached figure which represents a schematical view, in perspective, of a nonlimitative exemplary mode of the process according to the invention.

A plastic film 1 charged with static electricity, passes in a continuous manner under an enamelled wire 2 above which are placed parallel thereto two metallic bars 3 connected to ground, playing the part of "proximity ground." The wire 2 is connected by means of a resistance or capacitor 4 to the generator 5, delivering high voltage under the desired frequency. When beginning the operation, voltage is increased until a discharge, visible only in total darkness, takes place in a quite regular way over all the wire length, then voltage is maintained constant during all film unwinding.

A convenient and well known technique permitting evaluation of the efficiency of static electricity removing consists of sprinkling film surface, after treatment, with a pulverulent mixture of red lead and sulfur (H. Bertein, Revue Generale d'Electricite, pp. 461–474, 1960). While an uncompleted treatment is seen from the deposit of red lead granules on surface negative charges and sulfur powder on positive charges, no particle fixation occurs when charge removing has been total.

The device according to the invention has been applied successfully to the treatment of polypropylene films, polycarbonate films having a thickness of 2 microns and more, and metallized terephthalate polyester films 2.5 to 6 microns thick.

The operation was made in a continuous way in placing only a copper wire coated with a filled polyurethane varnish, at a distance from about 6 mm. from the film which unwinded in a continuous way. In working with a voltage of 4,500 volts, for frequencies from 100 to 700 Hertz, the static electricity from the films which circulated continuously at speeds from 1 to 4 m/s was wholly removed.

It will be obvious to those skilled in the art that various changes may be made without departing from the scope of the invention and the invention is not to be considered limited to what is shown in the drawing and described in the specification.

What is claimed is:

1. A process of removing static electricity from the surface of a thermoplastic polymer material selected from the group consisting of films, sheets and fabrics, comprising establishing a generally planar path of travel of said thermoplastic material;

providing above said path of travel and parallel to the plane thereof an enamelled conductive wire connected to a high-alternating current generator, and a conductive proximity ground spaced adjacent to said enameled conductive wire;

providing high-alternating current in the range of 2,000–8,000 volts at a frequency between 300 and 2,000 Hertz to said enamelled conductive wire from said high-alternating current generator, until a discharge, visible only in total darkness, takes place, and then maintaining the voltage producing said discharge constant; and passing said thermoplastic material in a continuous manner in said path beneath said wire while maintaining said voltage at said constant value.

2. An apparatus for removing static electricity from the surface of a thermoplastic material selected from the group consisting of films, sheets and fabrics, comprising means for continuously feeding said thermoplastic material along a generally planar path;

a treatment zone adjacent the path of travel of said thermoplastic material comprising means for discharging static electricity including an enamelled conductive wire spaced about 1 to 10 mm. from and parallel to the plane of said path of said material, means for maintaining a high AC voltage of about 2,000 to 8,000 volts at a frequency between about 300 to 2,000 Hertz on said wire, and a conductive proximity ground spaced adjacent said wire.

3. An apparatus according to claim 2 in which said wire, constituted of a metal or metal alloy, has a diameter between 0.01 and 1 mm.

4. An apparatus according to claim 2 in which said proximity grounds are placed above said enamelled wire at a distance approximately equal to the distance between the wire and the surface to be treated.

* * * * *